G. H. WHITE.
CLAMPING RING FOR PIPE COUPLINGS.
APPLICATION FILED NOV. 2, 1910.

1,036,944.

Patented Aug. 27, 1912.
2 SHEETS—SHEET 1.

WITNESSES

INVENTOR
George H. White
BY
Attorneys

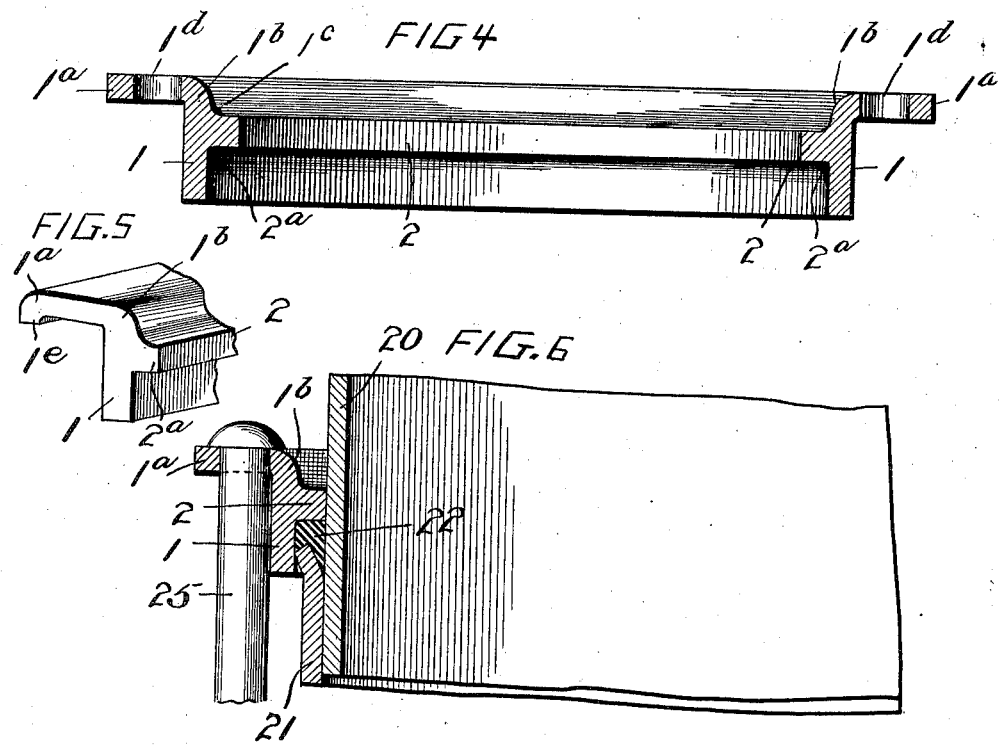

UNITED STATES PATENT OFFICE.

GEORGE HENRY WHITE, OF OIL CITY, PENNSYLVANIA, ASSIGNOR TO S. R. DRESSER MANUFACTURING COMPANY, OF BRADFORD, PENNSYLVANIA, A CORPORATION OF PENNSYLVANIA.

CLAMPING-RING FOR PIPE-COUPLINGS.

1,036,944.  Specification of Letters Patent.  Patented Aug. 27, 1912.

Original application filed June 7, 1910, Serial No. 565,596. Divided and this application filed November 2, 1910. Serial No. 590,397.

*To all whom it may concern:*

Be it known that I, GEORGE H. WHITE, citizen of the United States, residing at Oil City, in the county of Venango and State of Pennsylvania, have invented certain new and useful Improvements in Clamping-Rings for Pipe-Couplings; and I do hereby declare the following to be a full, clear, and exact description of the invention, such as will enable others skilled in the art to which it appertains to make and use the same.

My invention consists in the novel features hereinafter described reference being had to the accompanying drawings which show an embodiment of the same which I have selected for purposes of illustration, and also two forms of blank from which the ring can be produced, and the invention is fully disclosed in the following description and claims.

Figure 1:
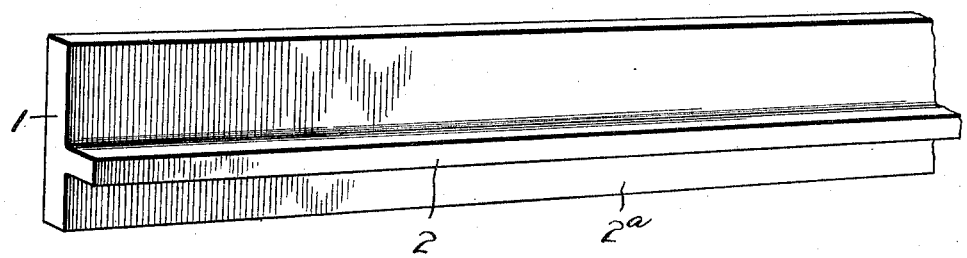
Figure 2:
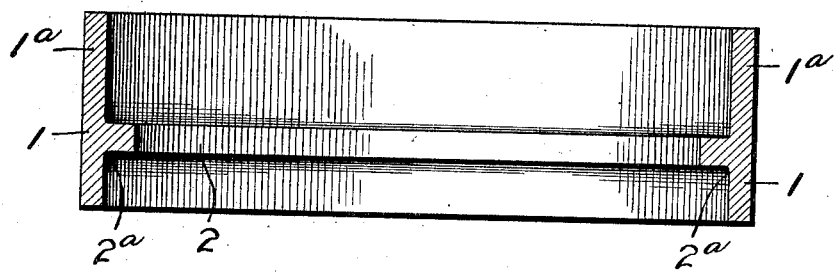
Figure 3:
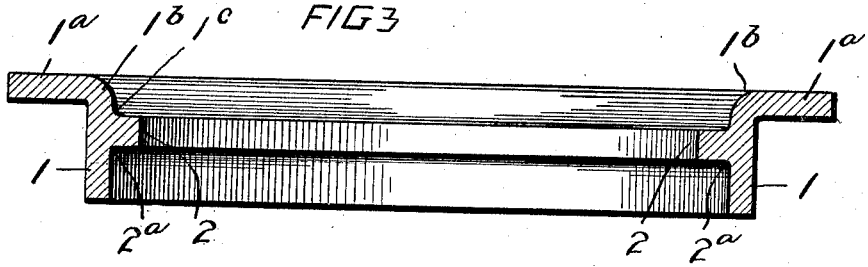

Referring to the said drawings, Figure 1 represents a form of rolled skelp or bar which I preferably employ in the manufacture of my improved ring. Fig. 2 is a sectional view of a tube or ring formed by bending a piece of the skelp shown in Fig. 1 into ring form and welding the ends. Fig. 3 is a sectional view of the tube or ring shown in Fig. 2 after one end of the same has been expanded and bent into a plane substantially perpendicular to the axis of the ring. Fig. 4 is a sectional view of the completed ring. Fig. 5 is a detail sectional view of a slight modification of the ring. Fig. 6 is a detail sectional view showing the ring in operative relation with a packing ring and the middle ring of a pipe coupling. Fig. 7 is a perspective view of a specially rolled skelp or bar, of the cross section of the finished ring from which the ring may be made. Fig. 8 is a detail view of a slightly modified form of skelp or bar.

The object of my invention is to provide a clamping ring for use in rubber packed pipe couplings, for example of the type known in the art as the Dresser coupling, which while affording the proper recess for a packing ring shall be so constructed as to provide great strength with a minimum of metal. In rings of this class the portion which supports the packing is subjected to great strain in one direction while the part through which the bolts pass is subjected to great strain in the opposite direction and it is one of the objects of my invention to so construct the ring that the pressure exerted by the bolts and nuts will be transmitted more directly to the portion which engages the packing, and to avoid the bending or breaking of the ring under strain.

In carrying out my invention I prefer to form the ring in the following manner: I first prepare a skelp or blank, as illustrated in Fig. 1, which comprises a flat plate 1, which is provided on one face with a longitudinally disposed projecting rib 2, located at a distance from one edge of the plate portion substantially equal to the depth of the packing recess desired in the finished ring, as indicated at 2ª. The skelp is preferably rolled in lengths sufficient for a number of blanks. A piece of this skelp is cut off of such length that when it is bent into ring form, and the ends united, the diameter of the ring at the inner edge of the rib 2, will accommodate a pipe of given diameter. The blank so formed by severing a piece of the skelp of the desired length is then bent into ring form, by any suitable bending means with the rib 2 on the inside, and the ends are united by welding. In severing the blank from the skelp the ends thereof may be so cut as to make a lap weld or a butt weld, and the welding may be done by fire heat and the use of a hammer or dies, or the ring may be welded electrically, as preferred. In any case care should be taken that in the welding operation the continuity of the rib 2 shall be preserved. I find it convenient in carrying out this step of my process to heat the meeting ends of the blank in a gas furnace and to hammer weld them by means of a hammer and anvil or peg such as are shown in my former Patent No. 863,477 dated Aug. 13, 1907 the peg in this instance being specially constructed to preserve the form and continuity of the rib 2 and the lateral edges of the plate portion 1 of the skelp. The ring thus far formed will be of cylindrical shape, as indicated in Fig. 2, with the rib projecting inwardly from its inner face.

The next step in my process consists in bending the longer portion of the ring wall, on one side of the rib 2, outwardly until it is in a position substantially perpendicular to the axis of the ring as shown in Fig. 3. This step must be performed in such a way as to avoid tearing or splitting the metal, which obviously must be expanded considerably more at its outer extremities than it is adjacent to the rib, and provision must be made for preventing any distortion of the other end of the cylindrical ring during this step. This bending of the longer portion of the ring wall into a position substantially perpendicular with the axis of the ring may be accomplished in the manner set forth in my application No. 565,596, filed June 7, 1910, of which this application is a division, or in any other suitable manner, and it may be performed by hand or by the use of any suitable machinery or tools. The effect of this operation is to roll down the end portion of the ring into a position substantially perpendicular to the axis of the ring, thus forming an outwardly projecting annular flange 1$^a$, the lower face of which is in substantial alinement with the upper face of the rib 2. In other words the outer flange 1$^a$ is stepped with respect to the rib 2, to afford the requisite metal for the bend, at 1$^b$ without distorting the rib, and thus produces a shallow recess 1$^c$ on the outer side of the rib. The ring is completed by providing the projecting flange 1$^a$ with bolt holes 1$^d$ at suitable intervals around the same, which may be formed by punching (preferably by cold punching) or in any other suitable manner. The ring thus formed provides a plate member (represented by the flange portion 1$^a$) disposed substantially perpendicularly to the axis of the ring, an annular flange member, represented by the cylindrical body portion 1 of the ring, extending from one face of the plate member, and having an inwardly projecting annular flange (represented by the rib 2) which is out of alinement with the plate member, and forming a packing recess 2$^a$ on the side of the rib 2, opposite the plate member.

It will be seen that the wrought metal ring produced by this process, possesses great strength to resist distortion under the stress of the clamping bolts 1$^d$ as the offset or stepped relation of the plate member 1$^a$ with respect to the bead 2, forming the packing recess provides a larger body of metal to resist the resulting strain produced on the ring by the tension of the bolts, and the resistance sustained by the rib 2 of the packing recess.

It is to be understood that I may provide means for standardizing and truing the portion of the ring which comes nearest the pipe, to wit, the inner face of the rib 2, and the annular flange portion 1. I prefer to perform this step of standardizing and truing before the bending of the end portion of the ring perpendicular to the axis thereof, and to retain the lower end of the same which forms the packing recess, in its true form during the formation of the plate member 1$^a$. I may, however, perform this step after the formation of the plate member 1$^a$ and at the same time, or before or after the bolt holes are made, as may be found most convenient. This step is performed by means of suitable dies, or by a holding die and an expanding mandrel engaging the lower end of the ring wall, and the rib portion 2 thereof, as will be readily understood, without particularly illustrating this step.

The finished ring is shown in Fig. 4. In some instances I may further stiffen the ring by bending the outer marginal portion of the flange 1$^a$ to form an annular flange 1$^e$ as shown in Fig. 5.

The ring which forms the subject of my present invention can also be made by rolling a bar or skelp of the cross section desired in the finished ring as shown in Fig. 7, having a main portion 11, provided with a longitudinal rib 12 extending on one side of the same and a flange portion 11$^a$ disposed substantially perpendicularly to the main portion 11 and connected therewith by a curved portion 11$^b$, so that the flange 11$^a$ is stepped with respect to or in a different plane from the rib 12, as desired in the finished ring. The ring is formed by taking a section of this skelp or bar, bending it into ring form and welding the ends together by electricity or otherwise, a butt, lapped or other style of weld being employed as preferred.

If it is desired to form the ring with an exterior bent up annular flange as indicated in Fig. 5, the skelp may be rolled with an exterior flange as shown at 11$^e$, Fig. 8, or the outer marginal portions of the part 11$^a$ may be bent up to form said flange after the ring is made, as may be found most advantageous or desirable.

In Fig. 6 I have shown a sectional detail of so much of a pipe coupling of the Dresser type as will illustrate its position in use. In this figure 20 represents a portion of one of the pipe sections to be united, 21 represents a portion of one end of the middle ring or coupling sleeve thereof, 22 represents a section of the packing ring, usually formed of rubber, and 25 represents one of the bolts, which engage the bolt holes of the clamping ring and connect it with the clamping ring at the other end of the coupling. It is to be noted that the pull of the bolt is conveyed in a very direct manner to the packing ring through the annular portion of the flange member 1 between the rib 2 and the plate member, which also tends to stiffen the ring, and the presence of this annular portion prevents the resistance of the packing against the rib 2, from co-acting with the bolt strain on the plate member in a cumulative manner, in tending to bend or distort the plate member with respect to the flange member, and there is little if any danger of either the rib 2, or the plate member 1$^a$ yielding under the strains imposed upon them. Should either of said parts yield slightly it would have no effect of causing the other of said parts to yield, as would be the case if the parts were in the same plane.

It is also to be noted that as shown in the drawing, the flange member of the ring has a cylindrical portion or wall between the rib 2, and the plate member, which is parallel to the bolts, and the bolt holes in the plate member are placed so that their inner edges are very close to the said cylindrical portion. Hence the portions of the heads or nuts of the bolts extend over the said cylindrical wall thus bringing the strain more directly in the length of the wall and the bolts lie very close to said cylindrical wall, which will prevent the bolts from bending inwardly to any appreciable extent under strain. This construction produces an exceedingly strong ring and effectively prevents any material bending of the plate member, and the inward bending of the bolts which would otherwise accompany the same.

What I claim and desire to secure by Letters Patent is:—

1. The herein described clamping ring for rubber packed pipe couplings formed from wrought metal and comprising an annular plate member disposed substantially perpendicularly to the axis of the ring, a cylindrical flange member formed integrally with the inner edge of the plate member, and extending to one side thereof and parallel with the axis of the ring, said flange member being provided on its interior between the plate member and its outer end with an inwardly extending annular rib forming the base of the packing recess, the inner edge of said rib forming the pipe aperture of the ring, said plate member being provided with a plurality of bolt holes, to receive clamping bolts, whereby a cylindrical wall is provided between the plate member and the said annular rib, extending alongside of and parallel to the bolts, thereby reinforcing the ring and preventing the strain on the rib and plate member from coöperating to distort the ring.

2. The herein described clamping ring for rubber packed pipe couplings formed from wrought metal and comprising an annular plate member disposed substantially perpendicularly to the axis of the ring, a cylindrical flange member formed integrally with the inner edge of the plate member, and extending to one side thereof and parallel with the axis of the ring, said flange member being provided on its interior between the plate member and its outer end with an inwardly extending annular rib forming the base of the packing recess, the inner edge of said rib forming the pipe aperture of the ring, said plate member being provided with a plurality of bolt holes having their inner edges close to the outer surface of the flange member, whereby the heads or nuts of the clamping bolts will extend over the end of the cylindrical wall of the flange member lying between the plate member and said annular rib, and said cylindrical wall will prevent the bolts from bending inwardly, adjacent to the heads or nuts thereof.

In testimony whereof I affix my signature, in the presence of two witnesses.

GEORGE HENRY WHITE.

Witnesses:
J. G. McCLINTOCK,
MICHAEL B. KENNEDY.